United States Patent [19]

Stille

[11] Patent Number: 4,507,462

[45] Date of Patent: Mar. 26, 1985

[54] LOW MOLECULAR WEIGHT AROMATIC POLYMERS WITH BIPHENYLENE END GROUPS

[75] Inventor: John K. Stille, Fort Collins, Colo.

[73] Assignee: Polymer Science, New York, N.Y.

[21] Appl. No.: 289,139

[22] Filed: Aug. 3, 1981

[51] Int. Cl.³ .............................................. C08G 12/00
[52] U.S. Cl. .................................... 528/125; 525/420; 525/435; 525/437; 525/471; 525/521; 525/535; 525/540; 528/126; 528/128; 528/173; 528/176; 528/179; 528/220; 528/225; 528/227; 528/229; 528/272; 528/274; 528/335; 528/337; 528/342; 528/391
[58] Field of Search ............... 528/125, 126, 128, 229, 528/173, 220, 225, 227, 176, 179, 272, 274, 335, 337, 342, 391; 525/420, 435, 437, 471, 521, 535, 540

[56] References Cited

U.S. PATENT DOCUMENTS

| | | | |
|---|---|---|---|
| 3,734,818 | 5/1973 | Stille | 528/125 |
| 3,852,244 | 12/1974 | Heath et al. | 528/125 |
| 4,000,187 | 12/1976 | Stille | 528/229 |
| 4,196,277 | 4/1980 | Jones et al. | 528/125 |
| 4,304,898 | 12/1981 | Rabilloud et al. | 528/125 |
| 4,375,536 | 3/1983 | Mark et al. | 528/125 |

*Primary Examiner*—Lester L. Lee
*Attorney, Agent, or Firm*—Pennie & Edmonds

[57] ABSTRACT

Biphenylene end-capped low molecular weight thermally stable aromatic polymers and the process for their preparation. The invention is further directed to crosslinked biphenylene end-capped aromatic polymers and to the process for their preparation. The process for preparing the biphenylene end-capped low molecular weight thermally stable aromatic polymers comprises carrying out a misbalanced polymerization reaction of a suitable aromatic aminoketone compound and a suitable aromatic ketomethylene compound and thereafter adding a monofunctional biphenylene compound.

21 Claims, No Drawings

LOW MOLECULAR WEIGHT AROMATIC POLYMERS WITH BIPHENYLENE END GROUPS

BACKGROUND OF THE INVENTION

Most thermally stable polymers, as a result of rigid aromatic units within the chain, are either partially crystalline, with the attending high crystalline transition temperatures, or else are amorphous but have high glass transition temperatures (Tg's). Both the crystalline and to some extent the amorphous materials tend to have poor solubility in common organic solvents. Those polyaromatics that are amorphous, and have relatively low Tg's, are processed readily but their use temperature is limited to the glass transition temperature, a temperature far below the thermal decomposition temperature.

In an effort to produce thermally stable polymers that could be fabricated readily and then converted to a material with high use temperatures, the applicant has in the past explored crosslinking reactions of aromatic polymers. Unfortunately, there are relatively few good crosslinking reactions of polyaromatics, in part because of their chemically inert structure and the reduced chain mobility. However, because biphenylene is known to react with aromatic structures to form stable links, applicant has been able in the past to effect the crosslinking reaction of polyaromatics by incorporating biphenylene directly into the polyaromatic main chain. Garapon, J.; Stille, J. K. *Macromolecules* 1977, 10, 627; Recca, A.; Garapon, J.; Stille, J. K. *Macromolecules* 1977, 10, 1344; Recca, A.; Stille, J. K. *Macromolecules* 1978, 11, 479; Stille, J. K. *Pure Appl. Chem.* 1978, 50, 273; Stille, J. K. *Vysokomol. Soedin.* 1979, 11, 2545. Thus, polyquinolines, polyamides, polyquinoxalines and polybenzimidazole, all containing biphenylene units within the main chain of the polymer, have been found to cross-link either thermally or with the aid of transition metal catalysts.

The resulting crosslinked polymers as mentioned above were insoluble in all solvents, had a higher storage moduli at ambient temperature, a higher storage moduli above the Tg, and a higher as well as a less intense (or nearly absent) Tg's as compared to the uncured polymer. From these reactions several observations were made: (1) In every case, crosslinking only took place above the Tg, even though the thermal or the transition metal catalyzed biphenylene reaction in some cases was known to take place at temperatures below the Tg; (2) Generally, the onset of the biphenylene exotherm, was above, but paralleled the Tg of the polymer. It had also been observed that in the presence of a transition metal catalyst such as a Ni(O) or Rh(I) complex, lower biphenylene reaction temperatures and shorter reaction times could be used to effect the same crosslinking reaction; (3) Relatively low incorporations of biphenylene (on the order of about 2.5 mole %) were sufficient to significantly raise the modulus of the cured polymer above its Tg; and (4) The thermal stability of the crosslinked polymers as measured by TGA was as good as the base or parent polymer which did not contain biphenylene units, indicating that crosslinks which were at least as stable as the types of structures in the parent polymer are formed and that reactions that generate unstable structures are not formed during crosslinking.

Although the crosslinking of a relatively wide variety of thermally stable polymers has been successfully accomplished by the incorporation of biphenylene units directly into the main polymer chain, there are a number of problems that have been encountered with this cross linking procedure, and for certain applications improvements in the curing reaction are desirable. Generally, shorter reaction times, and in some cases lower curing temperatures would be desirable.

One further specific problem in the past methods of crosslinking polyaromatics is the fact that the synthesis of biphenylene monomers for incorporation into a polymer main-chain requires the synthesis of difunctional biphenylene in "monomer grade" purity. Since these synthetic reactions generally do not process in high yields, the syntheses of simpler monofunctional biphenylene derivatives for use in crosslinking reactions in which high purity is not critical would be desirable.

SUMMARY OF THE INVENTION

Applicant has discovered that the above disadvantages can be overcome by synthesizing relatively low molecular weight polymers containing biphenylene end caps. By adjustment of the molecular weight and the chain structure, an easily melt processable polymer that thermosets in the mold is attainable.

The present invention is thus directed to biphenylene end-capped low molecular weight thermally stable aromatic polymers and to the process for their preparation. The invention is further directed to crosslinked biphenylene end-capped aromatic polymers and to the process for their preparation. The process for preparing the biphenylene end-capped low molecular weight thermally stable aromatic polymers comprises carrying out an imbalanced polymerization reaction of a suitable aromatic aminoketone compound and a suitable aromatic ketomethylene compound and thereafter adding a monofunctional biphenylene compound.

DESCRIPTION OF THE PREFERRED EMBODIMENTS

The synthesis of oligomers containing biphenylene end-groups requires monofunctional biphenylenes that can be utilized to cap thermally stable polymers (quinolines, quinoxalines, ketone ethers, aramides, benzimidazoles, etc.). The molecular weight of the polymer can be controlled through the appropriate AA, BB monomer balance and by the addition of the calculated amount of monofunctional biphenylene end cap.

More particularly, applicant has discovered that the biphenylene end-capped low molecular weight thermally stable aromatic polymers can be prepared by carrying out a imbalanced polymerization reaction of a suitable aromatic aminoketone and a suitable aromatic ketomethylene compound and thereafter adding a monofunctional biphenylene.

The reaction between an aromatic aminoketone and an aromatic ketomethylene compound to yield, for instance, polyquinoline, is disclosed in Beever, W. H., et al, *J. Polymer Science, Polymer Symp.* 1978, 65, 41 and in Norris, S. O., et al, *Macromolecules,* 1976, 9, 496, and the disclosure thereof is incorporated herein by reference. Applicant has discovered that in order to ensure that the resulting polymer is reactive to the monofunctional biphenylene so that the latter will end cap, that it is necessary that the polymerization reaction be a misbalanced reaction. By imbalanced it is meant that there must be a molar excess of the aminoketone as compared to the ketomethylene compound. In such a way, it has been found that the resulting aromatic polymer will react with the monofunctional biphenylene so that it will be end-capped thereby and that the monofunctional biphenylene will not otherwise enter into the main chain of the polymer.

As noted, the molecular weight of the polymer can be controlled by known means. By 'low molecular weight' it is intended herein to mean a molecular weight below about 15,000 $\overline{Mn}$. At much above this molecular weight the polymer becomes too rigid and too difficult to melt press in order to yield the crosslinked product. It is also desired that the molecular weight not be much below about 5,000 since then the polymer tends to be too brittle and it is difficult to make a suitable film.

It has been found that preferably the aromatic aminoketone compound is 4,4'-oxy-bis(2-benzoyl-benzenamine) and the aromatic ketomethylene compound is 4,4'-oxy-bis(acetophenone).

Preferably, the resulting low molecular weight biphenylene end-capped polymer according to the present invention is a polyquinoline of the formula:

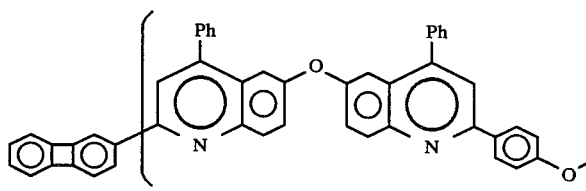 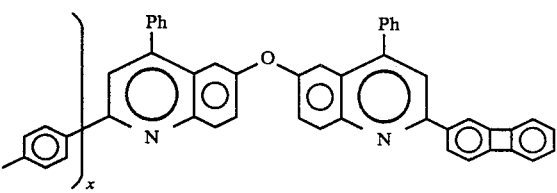

Polyquinolines of, for instance, a molecular weight of $\overline{Mn}=13,000$ and a degree of polymerization of 22 (DP) can be easily melt pressed into films at 325° C. and 5000 pound load. Thus, the above biphenylene end-capped polyquinoline was melt pressed at 325° C. and 5000 pound load in the presence of a nickel (O) catalyst (20 mole %), and held at that temperature for 15 min. The resulting film was completely insoluble in all solvents, and had a higher dynamic storage modulus than the parent, uncrosslinked polymer, both above and below Tg.

The results of curing biphenylene end-capped polyquinolines according to the present invention are given in Table 1. In contrast, when a polyquinoline of, for instance, a molecular weight of 5,000 $\overline{Mn}$ or 13,000 $\overline{Mn}$ but which did not contain the biphenylene end-cap was melt pressed at 325° C. and under a 5,000 lb. load for an hour, no curing or crosslinking took place.

Applicant has also discovered that when a transition metal catalyst is added to the biphenylene end-capped aromatic polymer that the cross-linking can then be affected at a far lower temperature and at a far more rapid and complete rate than in the case where no catalyst is utilized. Preferred transition metal catalysts for use in accord with this invention are the rhodium (I) catalysts or the nickel (O) catalysts, for example, a nonbornadienechlororhodium (I) dimer.

Biphenylene end-capped polyquinoline that did not have a transition metal catalyst added to it did not undergo thermosetting, and remained soluble even after treatment at 325° C./5,000 lb. load for two hours (entry 6, Table 1). By the addition of a transition metal catalyst (entries, 2, 3, 7–10), curing took place in a relatively very short time to yield polymers that were completely insoluble in organic solvents, and generally exhibited higher glass transition temperatures and higher moduli than the parent material before curing.

The present invention is thus also directed to a process for preparing crosslinked biphenylene end-capped aromatic polymers which comprises melt pressing a biphenylene end-capped low molecular weight aromatic polymer at a temperature above the glass transition temperature of the uncured/uncrosslinked polymer. More preferably, the invention is also directed to the cross-linking of a biphenylene end-capped aromatic polymer to which the suitable transition metal catalyst had been added. It has been found that suitable melt press temperatures are from about 300°–350° C. and that the melt pressing may be carried out at a pressure of about 5000 pounds load. The invention is also directed to the crosslinked polymer produced thereby.

The principles discussed herein for synthesizing the end-capped aromatic polymer and of curing/crosslinking can be extended to other polymer systems, besides polyquinolines, such as, without limitation, polyamides, polyquinoxalines, polybenzimidazoles, polysulfones, poly(ketone ethers), poly(ketone ether sulfones), polyesters, etc. Similarly, and as mentioned, the bisbiphenylene monomers necessary for incorporation into these classes of polymers have previously been synthesized, Garapon, J.; Stille, J. K. *Macromolecules* 1977, 10, 627; Recca, A.; Garapon, J.; Stille, J. K. *Macromolecules* 1977, 10, 1344; Recca, A.; Stille, J. K. *Macromolecules* 1978, 11, 479; Stille, J. K. *Pure Appl. Chem.* 1978, 50, 273; Stille, J. K. *Vysokomol. Soedin.* 1979, 11, 2545. The disclosure of the foregoing references is incorporated herein by reference. Accordingly, the monosubstituted or monofunctional biphenylenes, particularly biphenylene-2-carboxylic acid (and the corresponding acid chloride), 2-aminobiphenylene, and 2-biphenyleneglyoxal, can be utilized to end-cap the foregoing polymers according to the present invention.

The following examples are merely illustrative of various preferred embodiments of the present invention and are not intended to be a limitation upon the scope of the invention.

EXAMPLE 1

2-Acetylbiphenylene

The end-capping monomer, 2-acetylbiphenylene, was prepared as follows. To a flamed, 100 mL round bottom flask was added 2.1 g (15.7 mmoles) of AlCl$_3$. The flask was placed in an ice-bath and, under a N$_2$ atmosphere, 0.75 mL (0.81 g, 7.9 mmoles) of distilled acetic anhydride was added slowly with magnetic stirring. After a short time, 10 mL of dry CH$_2$Cl$_2$ was added and the mixture was stirred for 1 h. The solution was added over 15 minutes to a cooled solution of 2.0 g (13 mmoles) of biphenylene in 20 mL of dry CH$_2$Cl$_2$ in a −30° C. bath. The solution was maintained at −30° C. for 1.5 h, then it was allowed to warm to room temperature (0.5 h). The brown solution was poured into 110 g of ice and 30 mL of concentrated HCl and 500 mL of CH$_2$Cl$_2$ was added. The organic layer was separated, washed with H₂O and with saturated NaHCO₃ until basic, washed with H₂O and saturated NaCl then dried over Na₂SO₄. The solvent was removed under reduced pressure giving a crude solid which was purified by preparative TLC (CH₂Cl₂:hexane). A bright yellow product was obtained: 930 mg (62%), mp 134°-135° C. (lit. mp 132°-134° C., Baker, W.; Barton, J. W.; McOmie, J. F. W. *J. Chem. Soc.*, 1958, 2666).

EXAMPLE 2

Polymer Synthesis: Biphenylene End-Capped Polyquinoline $M_n = 5,000$. For the polymerization, 0.7629 g (3.000 mmoles) of 4,4'-oxy-bis(acetophenone) (Jones, M. E. B.; Thorton, D. A.; Webb, R. F. *Makromol. Chem.*, 1961, 49, 62. Shamis, E. M.; Dashevskii, M. M. *J. Org. Chem. USSR* (Engl. Transl.), 1967, 3, 1005), 1.4435 g (3.534 mmoles) of 4,4'-oxy-bis(2-benzoylbenzeneamine) (Norris, S. O.; Stille, J. K. *Macromolecules*, 1976, 9, 496), 23.5 g (84.8 mmoles) of di-m-cresylphosphate (Beever, W. H.; Stille, J. K. *J. Polym. Sci.*, Polym. Symp. 1978, 65, 41), and 7 mL of distilled m-cresol were mixed in a resin kettle fitted with a mechanical stirrer and nitrogen inlet and outlet. The resin kettle was purged with N₂, heated at 135°-137° C. for 24 h under static N₂, then cooled slightly and 0.2590 g (1.335 mmoles, 25% excess) of 2-acetylbiphenylene was added. The resin kettle was again purged with N₂ and heated at 135°-137° C. under static N₂ for 24 more hours at which time the dark red solution was poured into a vigorously stirred solution of 360 mL of ethanol and 30 mL of triethylamine. The mixture was ground-up at high speed in a blender and suction filtered. The resulting yellow powder was Soxhlet extracted for 62 h with 300 mL of ethanol and 25 mL of triethylamine then dried at 0.01 mm Hg and 105° C. for 48 h. Yield: 1.8 g (75%); $\eta_{int}^{25°\,C.} = 0.25$; Anal. Calcd: C, 85.91; H, 4.45; N, 4.63. Found: C, 84.93; H, 4.07; N, 4.48.

EXAMPLE 3

$M_n = 13,000$. The procedure was similar to the above except 1.3165 g (3.223 mmoles) of 4,4'-oxy-bis(2-benzoylbenzeneamine), 21.5 g (77.4 mmoles) of di-m-cresyl phosphate and 0.1082 g (0.557 mmoles, 25% excess) 2-acetylbiphenylene were used. The amount of 4,4'-oxy-bis(acetophenone) used was the same. Yield: 1.8 g (83%); $\eta_{int}^{25°\,C.} = 0.47$; Anal. Calcd: C, 85.64; H, 4.41; N, 4.70. Found: C, 85.01; H, 4.40; N, 4.54.

EXAMPLE 4

Addition of Catalyst to Polymer

A solution of the appropriate amount of (PPh₃)₂Ni(CO)₂ (Aldrich Chemical) or [NBD Rh Cl]₂ (Strem Chemicals) in dry benzene was added to biphenylene end-capped polyquinoline swelled in vigorously stirred, dry benzene. The mixture was stirred for 1 h, the solvent was removed under reduced pressure, and the resulting yellow powder was dried at 0.05 mmHg for 18 h at 75° C.

EXAMPLE 5

Melt Pressing

A modified Wabash hydraulic press (Model 12 10) fitted with Carver heated platens (Cat. No. 2102) was used for the melt pressing. An 170 mg sample of the polymer was placed in a small pile in between two 6″×6″ pieces of copper foil with a 0.005″ copper foil spacer (Baker #1-1714). The "sandwich" was then placed in the hydraulic press and melt pressed at 325° C. and 5,000 lb. load. The "sandwich" was then removed and immediately immersed in cold water. The film was removed by rolling the copper foil away from it. Any residual copper that had adhered to the surface of the film was removed by placing the film in concentrated NH₄OH for 30 min. then rinsing with water. The results of this melt pressing curing procedure are listed in Table 1.

TABLE 1

Melt Pressing Polyquinolines

| | $\overline{M_n}^a$ | wt % (PPh₃)₂Ni(CO)₂ | wt % [NBD Rh Cl]₂ | Melt Pressing time (min) | Tg, °C. (DSC) | Solubility$^b$ | $\frac{Tg, °C.^c}{E'_{\frac{1}{2}}/E''_{max}}$ | $E'_{25°C.}\left(\frac{dynes}{cm^2}\right)$ | $\frac{E^{\prime d}_{min}}{E'_{min}/T}\left(\frac{dynes}{cm^2}/°C.\right)$ |
|---|---|---|---|---|---|---|---|---|---|
| 1. | 5,000 | — | — | — | 212$^e$ | — | — | — | — |
| 2. | | 4.2 | — | 15 | 243 | 0 | 216/221 | 2.8 × 10¹⁰ | 1.4 × 10⁸/285°-335° |
| 3. | | 4.2 | — | 60 | 245 | 0 | 219/219 | 2.8 × 10¹⁰ | 1.3 × 10⁸/293°-329° |
| 4. | 13,000 | — | — | — | 232$^e$ | — | — | — | — |
| 5. | | — | — | 15 | 235 | 100 | 207/207 | 2.3 × 10¹⁰ | f |
| 6. | | — | — | 120 | 236 | >95 | 212/213 | 2.2 × 10¹⁰ | f |
| 7. | | 2.5 | — | 15 | 243 | 0 | 219/219 | 2.8 × 10¹⁰ | 1.0 × 10⁸/291°-330° |
| 8. | | 2.5 | — | 120 | 243 | 0 | 220/220 | 2.7 × 10¹⁰ | 1.0 × 10⁸/290°-334° |
| 9. | | — | 0.06 | 15 | 235 | 73 | 215/213 | 2.6 × 10¹⁰ | 4.0 × 10⁷/313°-325° |
| 10. | | — | 0.06 | 60 | 243 | 0 | 220/216 | 3.2 × 10¹⁰ | 8.0 × 10⁷/310°-341° |

$^a$Calculated by Mark-Houwink equation from viscosity and Mark-Houwink equation parameters (Beever, W. H.; Stille, J. K. Polym. Sci., Polym. Symp. 1978, 65, 41).

$^b$Solubility is defined as $100 - \left(\frac{\text{weight of sample after agitation for 24 h in excess CHCl}_3}{\text{weight of sample before exposure to CHCl}_3} \times 100\right)$ $^c$Tg's were taken as the temperature at which the room temperature storage modulus ($E'_{25°\,C.}$) was decreased by 50% and the temperature at which the loss modulus ($E''$) was at the maximum, as measured by the Rheovibron.

$^d E'_{min}/T$ is the lowest value of the storage modulus ($E'$) and the temperature at which this was observed. Typically, the storage modulus increased to values $> E'_{min}$ above 330° C.

$^e$Pressed powder samples prepared with the virgin polymer in a KBr press.

$^f$No data was obtainable above 250° C.

I claim:

1. A process for preparing biphenylene end-capped low molecular weight thermally stable aromatic polyquinoline polymers which comprises carrying out a misbalanced polymerization reaction of a suitable aromatic aminoketone and a suitable aromatic ketomethylene compound, wherein there is a molar excess of the aminoketone as compared to ketomethylene compound, and thereafter adding a monofunctional biphenylene compound.

2. The process of claim 1 wherein the aromatic aminoketone compound is 4,4'-oxy-bis(2-benzoyl-benzenamine) and the aromatic ketomethylene compound is 4,4'-oxy-bis(acetophenone).

3. The process of claims 1 or 2 wherein the end-capped low molecular weight polymer is a polyquinoline of the formula:

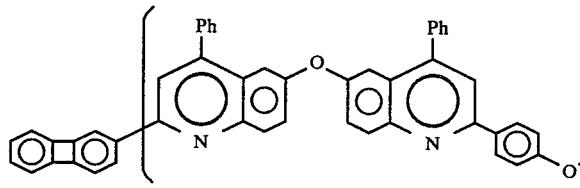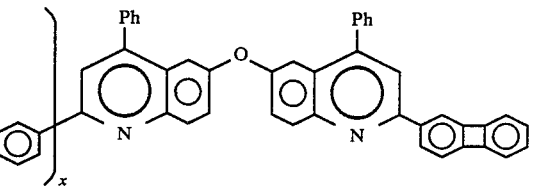

wherein X in an integer such that the molecular weight of the biphenylene capped polymer is between about 5,000 and 15,000.

4. The process of claim 1 wherein the monofunctional biphenylene compound is selected from the group of biphenylene-2-carboxylic acid (and the corresponding acid chloride), 2-aminobiphenylene, and 2-biphenyleneglyoxal.

5. The process of claim 1 wherein the molecular weight of the polymer is below about 15,000 $\overline{Mn}$.

6. The process of claim 1 which comprises further adding a transition metal catalyst.

7. The process of claim 6 wherein the transition metal catalyst is a rhodium (I) catalyst or a nickel (O) catalyst.

8. The process of claim 7 wherein the rhodium (I) catalyst is a norbornadienechlororhodium (I) dimer.

9. A biphenylene end-capped thermally stable low molecular weight aromatic polymer selected from the group of biphenylene end-capped polyquinolines, polyamides, polybenzimidazoles, polysulfones, poly(ketone ethers), poly(ketone ether sulfones) and polyesters.

10. The process of claims 9 wherein the end-capped low molecular weight polymer is a polyquinoline of the formula:

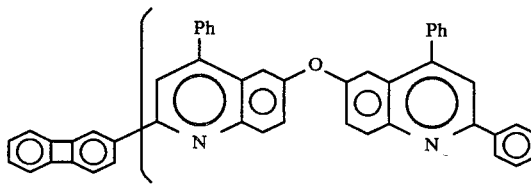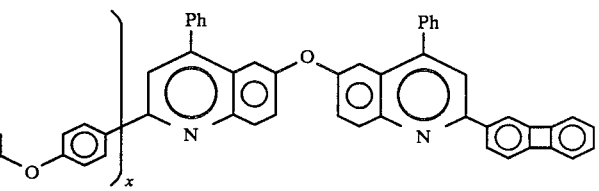

wherein X in an integer such that the molecular weight of the biphenylene capped polymer is between about 5,000 and 15,000.

11. The polymer of claim 9 wherein the molecular weight is below about 15,000 $\overline{Mn}$.

12. The polymer of claim 9 wherein the molecular weight is above about 5,000 $\overline{Mn}$.

13. A process for preparing crosslinked biphenylene end-capped aromatic polymers which comprises melt pressing a biphenylene end-capped low molecular weight aromatic polymer at a temperature above the glass transition temperature of the uncured polymer, and wherein the end-capped aromatic polymer is selected from the group of polyquinolines, polyamides, polybenzimidazoles, polysulfones, poly(ketone ethers), poly(ketone ether sulfones) and polyesters.

14. A process for preparing crosslinked biphenylene end-capped aromatic polymers which comprises adding a suitable transition metal catalyst to the biphenylene end-capped low molecular weight aromatic polymer, and thereafter melt pressing the polymer at a temperature above about the glass transition temperatures of the uncured polymer, and wherein the end-capped aromatic polymer is selected from the group of polyquinolines, polyamides, polybenzimidazoles, polysulfones, poly(ketone ethers), poly(ketone ether sulfones) and polyesters.

15. The process of claims 13 or 14 wherein the end-capped low molecular weight polymer is a polyquinoline of the formula:

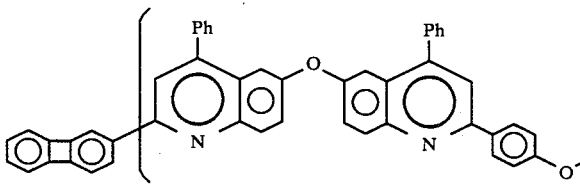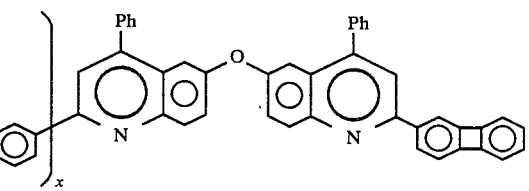

wherein X in an integer such that the molecular weight of the biphenylene capped polymer is between about 5,000 and 15,000.

16. The process of claims 13 or 14 wherein the temperature is from about 300°–350° C.

17. The process of claims 13 or 14 wherein the melt pressing is carried out at a pressure of about 5000 lbs. load.

18. The process of claim 14 wherein the transition metal catalyst is a rhodium (I) catalyst or a nickel (O) catalyst.

19. The process of claim 18 wherein the rhodium (I) catalyst is a norbornadienechlororhodium (I) dimer.

20. The crosslinked biphenylene end-capped aromatic polymer produced by the process of claims 13 or 14.

21. The process of claim 1 wherein the monofunctional biphenylene compound is 2-acetylbiphenylene.

* * * * *